United States Patent [19]
Tuli

[11] Patent Number: 5,420,697
[45] Date of Patent: May 30, 1995

[54] PORTABLE FACSIMILE/THERMAL PRINTER UTILIZING A MULTI-PURPOSE SINGLE ROLLER

[76] Inventor: Raja S. Tuli, 55 City Center Dr., Suite 500, Mississauga, Ontario, Canada, L5B 1M3

[21] Appl. No.: 20,368

[22] Filed: Feb. 22, 1993

[51] Int. Cl.$^6$ ............................................. H04N 1/024
[52] U.S. Cl. .................... 358/472; 358/498; 358/473; 358/296
[58] Field of Search ............... 358/473, 401, 476, 496, 358/501–503, 472, 296, 300, 471, 474, 482, 483, 498, 497; 346/160.1, 160; H04N 1/04, 1/23, 1/31; 400/120 HE

[56] References Cited

U.S. PATENT DOCUMENTS

| | | | |
|---|---|---|---|
| 4,583,126 | 4/1986 | Stoffel | 358/401 |
| 5,005,026 | 4/1991 | Sakai | 400/120 HE |
| 5,047,870 | 9/1991 | Filo | 358/472 |
| 5,077,618 | 12/1991 | Sakai et al. | 358/498 |
| 5,105,279 | 4/1992 | Kamada et al. | 358/472 |
| 5,162,916 | 11/1992 | Stemmle et al. | 358/472 |
| 5,229,869 | 7/1993 | Kikuchi et al. | 358/496 |

FOREIGN PATENT DOCUMENTS

| | | | |
|---|---|---|---|
| 0129476 | 10/1981 | Japan | 358/472 |
| 0106272 | 6/1985 | Japan | 358/473 |
| 1212162 | 2/1987 | Japan | 400/120 HE |

OTHER PUBLICATIONS

"Personal Communicator" *Washington Post* F1,3 11/4/92.

*Primary Examiner*—Edward L. Coles, Sr.
*Assistant Examiner*—Madeleine ANH-Vinh Nguyen

[57] ABSTRACT

A normal size facsimile machine (8½ inches wide) is to be made for portable applications, with the added feature of being a thermal printer. The design is focused on a slim profile of extremely light weight. All components that can be attached externally only when needed, have been removed from the main body, and built as separate add on modules. Printing speeds are fast due to thermal technology and extremely economical. As far as portable facsimiles are concerned, this is quite a unique machine due to its compact size, 8½ inch wide print capability, and high speed with low power consumption.

2 Claims, 1 Drawing Sheet

PORTABLE FACSIMILE/THERMAL PRINTER UTILIZING A MULTI-PURPOSE SINGLE ROLLER

BACKGROUND OF THE INVENTION

This invention relates to an apparatus and a method for producing a portable facsimile machine with a thermal printer, capable of printing on to 8½ inch wide thermal paper. In particular, the apparatus employs a single soft durometer roller, to drive the scanner and printer mechanism simultaneously, if required. This is dependent on the mode in which the machine is in.

Conventional facsimile communication methods are utilized by the invention, as are the components. What is unique about the invention is the fact that a single roller is utilized for both scanning and or printing.

Another unique feature is that the media, either sheet feed or roll form, is externally stored enabling compact, lightweight design and portability.

SUMMARY OF THE INVENTION

Generally speaking, in accordance with the present invention, a portable facsimile machine/thermal printer is constructed having properties of lightweight, slim design, and low power consumption.

The heart of the invention lies in the drive mechanism. Only one roller is used in the invention to drive the scanner and also the printer, simultaneously if required. This is a significant accomplishment in cutting power requirements considerably for this machine, as only one motor is required instead of two. This was achieved by positioning the scanner and print head on opposite sides of the drive roller. For printing only, the scanner is retracted by a special cam mechanism.

BRIEF DESCRIPTION OF DRAWINGS

This invention maybe better understood and its numerous objects and advantages will become apparent to those skills in the art by reference to the accompany drawings as follows.

DETAILED DESCRIPTION OF PREFERRED EMBODIMENTS

Figure 1:
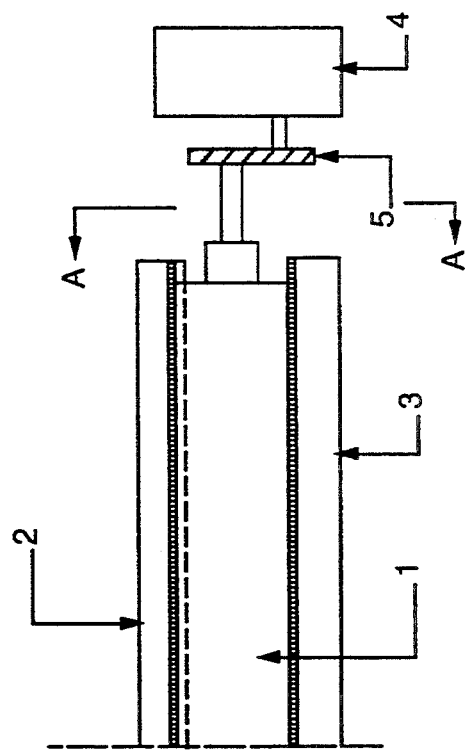
FIG. 1 is a diagrammatic view showing the basic layout of components of the portable facsimile/thermal printer in accordance with the present invention.

Reference is made to FIG. 1, which illustrates the portable facsimile/thermal printer component layout. There exists a single main drive roller 1, above which is located a thermal print head 2, and below which is located a contact scanner 3. The drive roller is powered by a drive motor 4 through a gear system 5.

Figure 2:
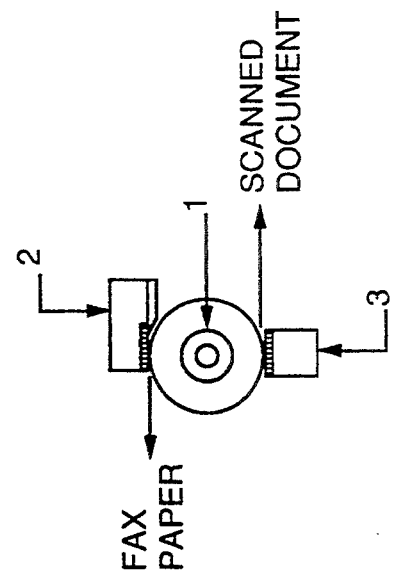
FIG. 2 is a sectional view along the line AA of FIG. 1 illustrating the scanning and printing operation and also the position of the scan head and print head with respect to the drive roller.

Reference is now made to FIG. 2, which illustrates the position of the contact scanner 3, and the thermal print head 2, on opposite sides of the drive roller 1.

Power consumption is reduced considerably when scanning and printing simultaneously, as only one drive roller is employed instead of two or more, in other machines of similar functions. When printing only, the contact scanner is retracted from the drive roller via a cam mechanism, so as to remove any friction resistance between the roller and scanner glass, thus reducing the torque and power requirements on the drive motor.

Size has also been reduced considerably for a machine with the described capabilities. Using the most compact configuration, in accordance with the invention, the absolute minimum dimensions were derived utilizing selected facsimile components. Length$<12.0''\times$width$<2.5''\times$height$<2.0''$.

It is also understood that the following claims are intended to cover all of the general and specific features of the invention herein described, and all statements of the scope of the invention which, as a matter of language, might be said to fall therebetween.

I claim:

1. A device capable of printing and scanning simultaneously using a single roller to accomplish both tasks such that:

the printing is accomplished through the use of the thermal print head which prints a single line of dots parallel to the roller;

the said printer prints on thermal sensitive paper which is sandwiched between the roller, which is fixed, and the said thermal print head;

a scanner with a scan head which senses a linear array of dots at a time parallel to the roller, is situated on the opposite side of the roller to the printer;

the scanner senses dots that are located on an original when the original is pressed against the roller by the scan head, which is springed against it allowing scanning in two dimensions as paper is moved by the roller;

as the said scanner scans each linear array of dots parallel to the roller, the said printer prints a linear array of dots containing the same information simultaneously on the thermal sensitive paper on the opposite side of the roller, and both these tasks are performed repeatedly as the original and thermal sensitive paper move with the force of the roller in opposite directions.

2. A device as claimed in claim 1 such that the pressure of the scan head against the roller can be removed with the use of a release mechanism, to allow the device to print a document by getting information other than from the scan head.

* * * * *